United States Patent [19]

Scharlack

[11] 3,880,474

[45] Apr. 29, 1975

[54] SKID CONTROL SYSTEM

[75] Inventor: Ronald S. Scharlack, San Antonio, Tex.

[73] Assignee: Kelsey-Hayes Company, Romulus, Mich.

[22] Filed: Oct. 18, 1971

[21] Appl. No.: 190,336

Related U.S. Application Data

[63] Continuation of Ser. No. 875,411, Oct. 10, 1969, abandoned.

[52] U.S. Cl. .................. 303/21 P; 303/20
[51] Int. Cl. ........................... B60t 8/10
[58] Field of Search ............ 188/181; 303/20, 21; 317/5; 324/161-162; 340/52 B, 53, 62, 261-262

[56] References Cited
UNITED STATES PATENTS

| | | | |
|---|---|---|---|
| 3,362,757 | 1/1968 | Marcheron | 303/21 P |
| 3,467,443 | 9/1969 | Okamoto et al. | 303/21 BE |
| 3,467,444 | 9/1969 | Leiber | 303/21 BE |
| 3,503,653 | 3/1970 | Davis et al. | 303/21 CF |
| 3,556,610 | 1/1971 | Leiber | 303/21 P |
| 3,574,417 | 4/1971 | Howard et al. | 303/21 BE |
| 3,582,152 | 6/1971 | Burckhardt et al. | 188/181 A X |
| 3,589,777 | 6/1971 | Leiber et al. | 303/21 BE |
| 3,604,760 | 9/1971 | Atkins | 188/181 A X |
| 3,620,576 | 11/1971 | Wehde et al. | 303/21 BE |

*Primary Examiner*—Trygve M. Blix
*Assistant Examiner*—Stephen G. Kunin
*Attorney, Agent, or Firm*—Harness, Dickey & Pierce

[57] ABSTRACT

A control system and force motor assembly for controling the skidding of a vehicle under braked conditions wherein the control system provides a signal wave form which controls the position of an armature or fluid pressure controlling device in one of three conditions; the first being "dump" mode of operation wherein the force motor is controlled to preclude braking pressure from being supplied to the wheels of the vehicle, the "hold" mode of operation wherein the braking force present at the time the system goes into the "hold" mode of operation is maintained, and the "return" mode of operation wherein braking pressure is returned to the vehicle wheels.

The control system is effectively responsive to a critical slip signal, the signal being generated in response to a sensed difference between a hypothetical vehicle deceleration, as approximated by a decreasing ramp signal, and the vehicle wheel speed. This comparison is made on a differential basis to provide an output signal which is utilized in controlling an output gate. The gate is also responsive to the sensing of a positive wheel acceleration signal and a change in sign of the rate of change of wheel acceleration. The signal from the output gate is fed to a second logic circuit which controls the operation of a variable duty cycle pulse generator, the duty cycle of the pulse generator being modulated in accordance with the sensed condition at the wheel, the lower end of the duty cycle range creating the "dump" mode of operation, the intermediate range duty cycle creating the "hold" mode of operation and the high duty cycle range providing the "return" mode of operation.

The force motor is fabricated with a three position armature which is adapted to be placed either in the return or deactuated position where no signal is provided from the control circuit of a minimum duty cycle signal, a skid signal or dump mode of operation which connects the manually actuated brake cylinder hydraulically to the wheel cylinders to provide full braking pressure, and the hold position which maintains the pressure being fed to the wheels at the time the hold position is achieved. This latter position is actually a range of positions for the armature, the position being selected as a function of the position of the armature when the hold mode is entered.

20 Claims, 5 Drawing Figures

PATENTED APR 29 1975　3,880,474
SHEET 3 OF 3
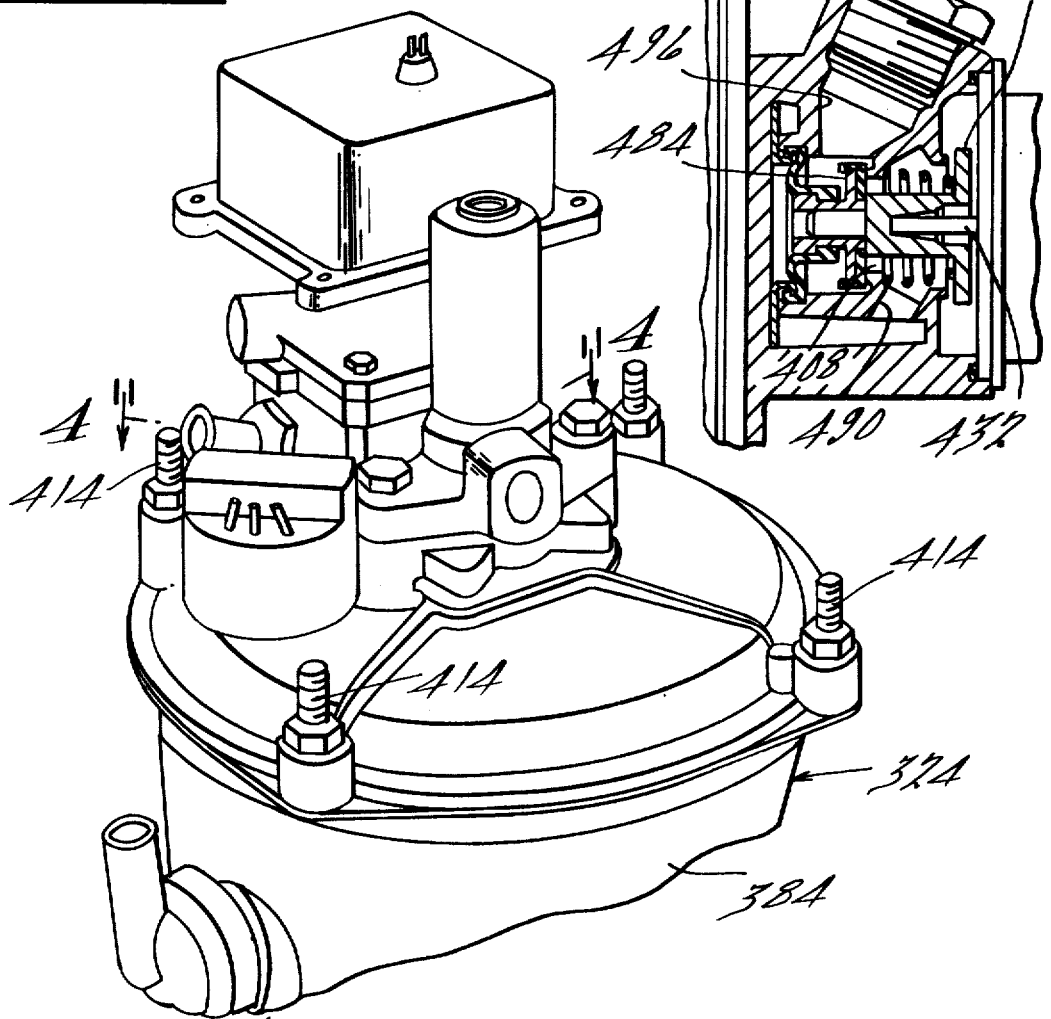
FIG.3.
FIG.4.
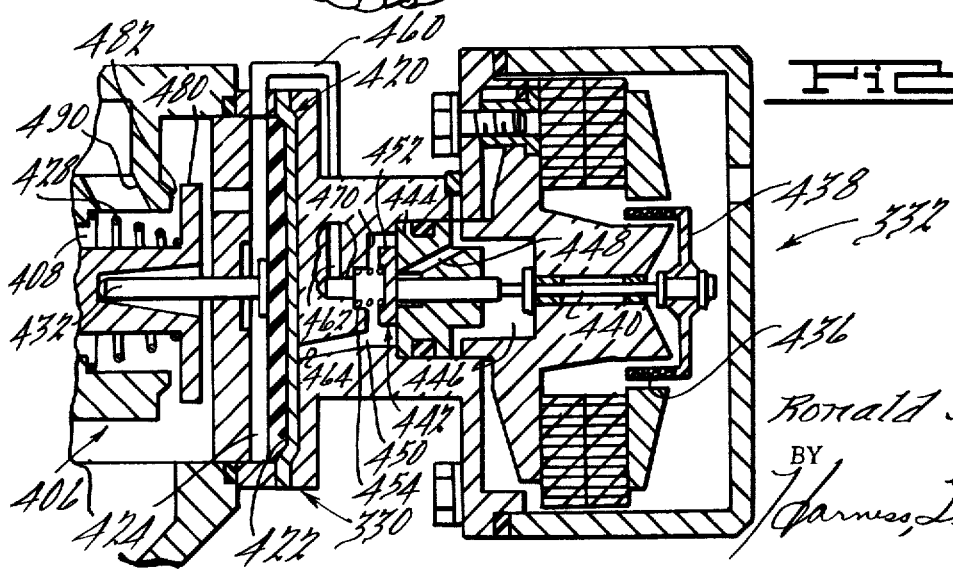
FIG.5.
INVENTOR.
Ronald S. Scharlack
BY
Harness, Dickey & Pierce
ATTORNEYS.

SKID CONTROL SYSTEM

This is a continuation of application Ser. No. 875,411 filed Nov. 10, 1969 now abandoned.

BACKGROUND AND SUMMARY OF THE DEVELOPMENT

This invention relates generally to vehicle braking systems and, more particularly, to a brake control system for preventing wheel skidding and minimizing stopping distances while maintaining directional stability through a system which senses, on the run-down portion of the cycle, a critical slip and, on the spin up side of the cycle, a positive wheel acceleration and a change in sign of the rate of change of the wheel acceleration signal to produce a varying duty cycle output control signal which is utilized to control the position of the armature of a force motor connected in pressure controlling relation with a wheeled vehicle braking system.

For purposes of describing the system of the present invention, the term "slip" refers to a characteristic of the rotating element whereby the element rotates at less than its free rolling speed when a braking force or torque is applied. In the context of the system, this slip may be approximated by a hypothetical measure of the vehicle speed in comparing this vehicle speed to a wheel speed. The term "skid" or "slide" refers to a locked wheel condition.

One of the major difficulties which arises in braking a moving vehicle, such as an automobile, an aircraft or other wheeled vehicle, occurs when the braking wheel, or wheels, skid or slide, this skid tending to create an unstable condition in the controlled motion of the vehicle. Wheel lockup may cause such a loss in directional stability as to result in an uncontrolled skidding or sliding while at the same time the presence of locked wheels generally increases the distance required to stop due to the reduced coefficient of friction while skidding.

Several skid control systems have evolved which are effective under various road conditions to minimize stopping distance while maximizing the directional stability of the vehicle. For example, one system is disclosed in copending application of David B. Eisenhaure and Ronald S. Scharlack, Ser. No. 626,626, now U.S. Pat. No. 3,508,795 which utilizes the linear and angular accelerations of the braking wheel as sensed by appropriate acceleration devices. Another such system is disclosed in copending application of Ronald S. Scharlack, Ser. No. 854,876, filing date Sept. 3, 1969, and executed on Aug. 28, 1969, which discloses a critical slip sensing system and a logic circuit to detect when the system is in a critical slip or when a positive wheel acceleration signal exists in conjunction with a change in sign of the rate of change of wheel acceleration from a positive to a negative value.

This latter system is utilized, in conjunction with additional logic circuitry, to provide a three mode control signal which is utilized to control the force motor, and the armature associated therewith, in three modes of operation, the dump, the hold and the return mode of operation.

It has been discovered that, contrary to previous system concepts, that a braking system may be used most efficiently if, upon sensing of the acceleration or spinup of the wheel, that the brake pressure be held at a particular value rather than dropping the brake pressure down by continuous dumping of brake pressure. Since the wheel is already starting the spinup portion of the cycle, it is not necessary to further dump brake pressure. Rather, it is the purpose of the present system to hold the brake pressure at the particular value at which spinup will occur and reapply brake pressure upon the sensing of the inflection point on the spinup side of the cycle. At this inflection point, the brake pressure is again applied (the return mode) to cause the wheel to decrease its rate of change of acceleration and finally achieve the run-down or decelerating portion of the cycle. Prior to the achieving of the critical slip point, the brake pressure is returned to the wheels at a preselected rate of return.

For purposes of this discussion, the portion of the cycle between the application of brake pressure initially and the sensing of the critical slip point will be referred to as the preskid portion of the cycle. The portion of the cycle between the critical slip point and the start of the spinup of the wheels will be called the skid portion of the cycle. The portion of the cycle between the start of spinup and the sensing of the inflection point at which the rate of change of acceleration changes sign will be called the acceleration mode of operation and the final portion of the cycle between the inflection point and the top of the spinup portion of the cycle will be called the post-inflection portion of the cycle. The system then achieves the preskid portion.

In the system of the present invention, a control signal is generated which is a series of pulses having a duty cycle which varies in accordance with the particular mode of operation to be utilized in controlling the braked wheel. In controlling this system of the present invention, the duty cycle is varied from a zero level before the application of brake pressure to a preset low level during the skid mode. The duty cycle is then caused to steadily increase during the skid mode to a constant duty cycle level during the acceleration mode of operation. The duty cycle is decreased at a constant rate during the post-inflection mode of operation.

Accordingly, it is one object of the present invention to provide an improved system for operation the brakes of a wheeled vehicle.

It is another object of the present invention to provide an improved skid control system for the brake or brakes of a wheeled vehicle.

It is still a further object of the present invention to provide an improved brake control system of the type described which is capable of eliminating skidding or sliding of the brake wheel including a provision for holding the brake pressure during a predetermined portion of the wheel velocity cycle.

It is still another object of the present invention to provide an improved triple mode skid control system which includes an improved skid sensing system.

It is still a further object of the present invention to provide an improved skid control system incorporating an improved logic circuit.

It is still a further object of the present invention to provide an improved skid control system which incorporates a circuit for generating a critical slip signal.

It is still a further object of the present invention to provide an improved triple mode skid control system which generates a critical slip signal and responds to a function of the wheel speed and hypothetical vehicle speed signal.

It is still a further object of the present invention to provide an improved skid control system incorporating a triple mode valve.

It is still another object of the present invention to provide an improved skid control system incorporating three modes of operation, a dump, hold and return mode.

It is another object of the present invention to provide an improved logic control system for use in connection with a skid control system which correlates the first and second derivative of the wheel speed signal and also a critical slip signal to control the operation of a triple mode valve.

It is still a further object of the present invention to provide an improved skid control system which is reliable in use, inexpensive to manufacture and easily installed.

Further objects, features and advantages of this invention will become apparent from a consideration of the following description, the appended claims and the accompanying drawings in which:

FIG. 3 is an end view of the force motor and valve assemblies of FIG. 2;

FIG. 4 is a cross-sectional view of FIG. 3, taken along line 4—4 thereof; and

FIG. 5 is an enlargement of a portion of FIG. 2.

It is to be understood that the skid control system of the present invention is particularly adapted to be utilized and will be described specifically for use with an automotive vehicle. However, it is to be understood that the features of the invention may be utilized with other types of vehicles including aircraft and other wheeled vehicles which are adapted to provide braking through a wheel type of element. In the case of an automotive use, the system of the present invention may be utilized in connection with either the front wheels, the rear wheels or both the front and rear wheels. However, for simplicity, the system will be described for use in conjunction only with the rear wheels of an automotive vehicle.

Figure 1:
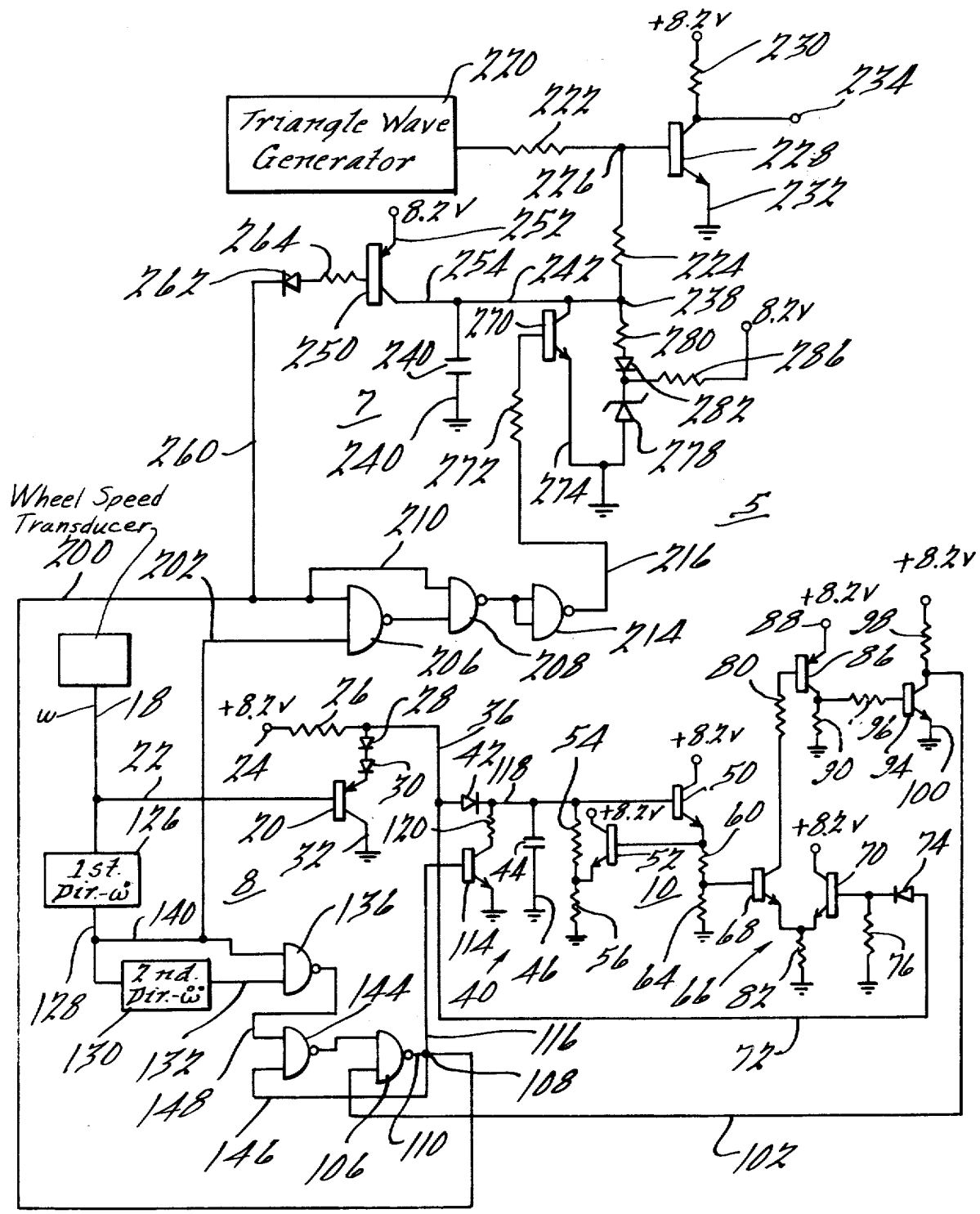
FIG. 1 is a schematic diagram illustrating the features of the novel skid control system of the present invention.

Referring particularly to FIG. 1, there is schematically illustrated a control system 6 which includes an output circuit 7 to generate a series of output pulses at an output terminal thereof, the duty cycle of the pulses being controlled in accordance with the particular wheel velocity being sensed during the braking cycle of the wheel. This wheel velocity is sensed by means of a logic circuit 8 which is responsive to both the first and second derivative of the wheel angular velocity and also to a critical wheel slip signal which is generated by means of a critical slip circuit 10.

Referring particularly to the critical slip circuit 10, the circuit is utilized to control the release of the brakes on the rundown portion of the stopping cycle and the wheel acceleration and rate of change of wheel acceleration signal generating circuit 8 is utilized in reapplying the brakes. Particularly, the circuit 10 includes an input from a wheel velocity sensing transducer (not shown) which provides a wheel velocity input signal of omega ($\omega$) to an input conductor 18. This signal is fed to an input amplifier transistor 20, and particularly to the base electrode thereof, by means of a conductor 22. The emitter-collector circuit of the transistor 20 is connected to a positive source of d.c. potential at terminal 24 through a resistor 26 and a pair of diodes 28 and 30. The collector electrode of transistor 20 is grounded at 32.

Figure 2:
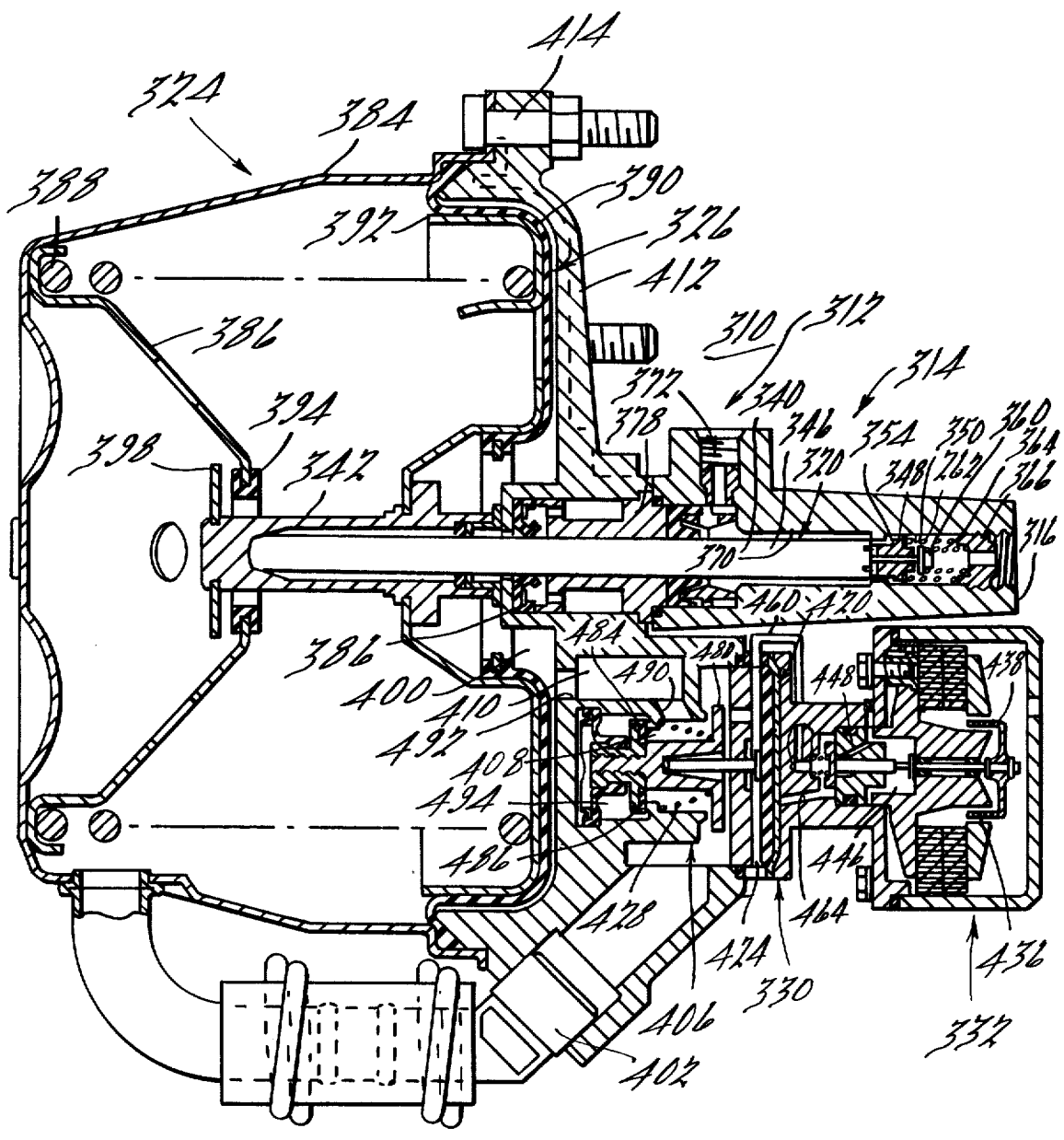
FIG. 2 is a cross-sectional view of a preferred form of triple-mode, force motor and control valve for use in connection with the circuit of FIG. 1.

The transistor 20 is biased such that the entire wheel velocity signal, as illustrated in FIG. 2 of the aforementioned copending application Ser. No. 854,876, is transmitted through the output conductor 36 connected to the junction between the upper diode 28 and the resistor 26. The diagram of the aforementioned copending application illustrates a portion, and particularly one cycle, of the wheel velocity signal as impressed on conductor 36. The wave form is seen to be a damped oscillatory wave which is generally symmetrical about a decreasing straight line having a negative slope. The wheel velocity wave form impressed on conductor 36 is fed to a vehicle speed ramp generating circuit 40. The circuit 40 generates a ramp voltage which nearly approximates the actual vehicle speed. This ramp voltage may be selected to be of any configuration desired and, in a particular illustrated embodiment, the ramp is chosen to be one unity of gravity deceleration rate of the vehicle.

Particularly, the signal on conductor 36 is fed through a diode 42 to a capacitor 44, the opposite plate of the capacitor being grounded at 46. Thus, as long as the voltage on conductor 36 exceeds the voltage on capacitor 44, the current will be fed to the capacitor 44. Thus, the capacitor is initially charged to a voltage which is representative of the unbraked wheel speed.

For purposes of this discussion, the wheel velocity will be considered to be a damped oscillatory wave which oscillates about a relatively straight line having a negative slope, as described above. Further, the portions of a single cycle of the wheel velocity wave will be referred to as described above, i.e., the preskid portion, the skid portion, the acceleration portion, and the post-inflection portion. These portions of the cycle have been described in the preamble of this specification.

Accordingly, it is seen that the vehicle speed curve initially starts at a flat constant value which, after the wheel is braked, commences deceleration during the preskid portion of the cycle. Accordingly, the capacitor 44 is charged to a voltage which is a function of the wheel velocity during this relatively flat portion of the preskid portion of the cycle. Upon deceleration of the wheel toward the critical slip point, the wheel velocity signal is less than the charge on capacitor 44 due to the slow discharge circuit of capacitor 44 to be described hereinafter. Accordingly, the discharge circuit of capacitor 44 will cause the voltage on the capacitor to follow a hypothetical straight line which hypothetically approximates the car velocity, in this case a one gravity deceleration. However, the wheel velocity is rapidly decreasing due to the brake force applied to the wheel.

This capacitor discharge circuit is seen to include a transistor 50 and a transistor 52. Also, a voltage divider circuit including a resistor 54 and a resistor 56 are included in the discharge circuit. Particularly, the current flows through the baseemitter circuit of transistor 50, the base-emitter circuit of transistor 52 and then to ground through the resistor 56, the baseemitter drops create a constant voltage across resistor 54. Accordingly, a voltage is fed to a voltage divider circuit, including resistors 60, 64, the resistors 60, 64 being chosen to provide a preselected percentage of the vehicle velocity signal to one input circuit of a differential amplifier system 66. It is to be noted that the velocity signal being fed to the one input circuit of the differential amplifier 66 is directed through two diode drops, including diode 42 and the base-emitter circuit of transistor 50. This signal is fed to the base circuit of transistor 68 of the differential amplifier 66. The use of a percentage vehicle velocity signal is optional and other systems may be utilized.

On the other hand, the wheel velocity signal is also fed to the other input terminal of the differential amplifier circuit 66, and particularly to the base circuit of a transistor 70 through a conductor 72 and diode 74. This voltage is developed across a resistor 76 which is connected between the base electrode of transistor 70 and ground. In this case, it is noted that the wheel velocity signal is directed through a single diode drop, particularly diode 74.

The differential amplifier circuit 66 is of the conventional type and includes an output circuit, in this case a current limiting resistor 80, and the two emitter electrodes of transistors 66 and 70 are connected to ground through resistor 82. When the vehicle velocity signal fed to transistor 68 is sufficiently above the wheel velocity signal (in this case determined by the voltage divider resistors 60, 64 and the two diode drops across the diode 42 and the transistor 50 in the case of the vehicle velocity signal, and the voltage drop of the diode 74 in the case of the wheel velocity signal), the transistor 68 will be nonconductive and the transistor 70 will be conductive. However, when the wheel velocity signal drops by a preselected amount below the decreasing ramp voltage, the transistor 68 will be rendered conductive and the transistor 70 will be rendered nonconductive. This differential operation creates a critical slip signal which is a function of the wheel velocity and the vehicle velocity ramp signals.

When this critical slip is reached, the output signal from the transistor 68 is fed to an inverter amplifier transistor 86, the emitter of which is connected to a positive 8.2 volt potential at terminal 88 and the collector of which is connected to ground through a resistor 90. This critical signal causes transistor 86 to conduct to provide an output signal to a second inverter transistor 94 through a resistor 96. The second transistor 94 is connected to a positive potential through a resistor 98 and ground potential at 100. The conduction of transistor 86 causes normally nonconductive transistor 94 to conduct, therby grounding the output conductor 102 connected to the collector electrode of transistor 94.

The signal on conductor 102 is fed to the circuit 8 and particularly to an "and" gate which has the characteristics that two positive signals to the input thereof will create a logical zero output signal and all other signal conditions will create a positive or logical one output signal, as for example, in the case of a zero input or both inputs being zero. This output signal from gate 106 is fed to an output node 108 connected to the input circuit of the control system 7 to be described hereinafter. The control circuit 7 is utilized to control the output duty cycle being fed to a triple mode force motor and valve assembly to be described in conjunction with FIGS. 2 to 4.

In the particular embodiment illustrated, the output signal is fed back to a disabling transistor 114 through a conductor 116. This positive signal will cause the normally nonconductive transistor 114 to conduct, thereby grounding conductor 118 through the collector emitter circuit of transistor 114 and the resistor 120. This will rapidly discharge the capacitor 44 to disable the slip circuit. As will be seen from a further description of this system, the logic circuit, including gate 106, is designed to latch the output on until such time as certain conditions are sensed in the acceleration and rate of change of acceleration circuit 8. Thus, the disabling of the slip circuit will not effect the output signal being fed to the solenoid. It is to be understood that the disabling circuit, including conductor 116, transistor 114 and the resistor 120, may be eliminated in certain configurations of skid control systems. Further, the critical slip circuit 10 described above is presented purely for illustrative purposes and it is to be understood that other similar types of critical slip circuits may be utilized to generate the signal being fed to the gate 106.

Referring now to the circuit 8, the wheel velocity signal omega ($\omega$) impressed on conductor 18 is fed to a first differential circuit 126 which provides the differential of the wheel velocity signal on output conductor 128. It is to be understood that the differential circuit will be designed to provide the proper polarity of signals. The output from differentiator 126 is also fed to a second differential circuit 130 to provide a rate of change of wheel acceleration signal on the output conductor 132. This latter signal is fed to an output "and" gate 136 which is utilized to correlate the first and second derivatives of the wheel velocity signal, the first derivative signal being fed to the gate 136 by means of a conductor 140.

As stated above, the critical slip circuit 10 provides a logical zero input signal to the gate 106 to provide a logical one output signal from the gate 106 on conductor 110. This output signal is also fed to the input circuit of a third gate 144 by means of a conductor 146. Thus, gate 144 is responsive to the signals on conductor 146 and a conductor 148. The input signal to gate 136 from the differential circuit as impressed on conductor 140 is positive when the rate of change of wheel acceleration signal is less than zero. On the other hand, the signal on conductor 140 is at a logical one level when the omega dot ($\dot{\omega}$) signal is greater than zero.

It is to be noted that the omega dot, or wheel acceleration signal, is negative or less than zero for the entire first half of the wave. On the other hand, the rate of change of acceleration signal or omega double dot ($\ddot{\omega}$) is negative during the first 90° of the wave form and is positive during the second 90° of the wave form. Accordingly, the signal on conductor 140 will be at a logical zero during the whole first half of the cycle and the signal on the conductor 132 will be at a logical zero and switch to a logical one.

The first derivative signal as supplied by differentiator circuit 126 is normally zero and switches to a positive signal when the wheels accelerate. The signal on conductor 132 is normally at a logical zero and then switches to a positive level with a negative second derivative of the wheel velocity signal. Accordingly, during the preskid portion of the cycle, the first derivative signal on conductor 140 is a negative, the critical slip signal on conductor 102 is a positive level signal and the output from conductor 136 is a logical zero. During the skid portion of the cycle, the first derivative is a logical zero and the critical slip signal on conductor 102 is a logical zero. This renders the output on conductor 148 a logical one level and the output from gate 106 on conductor 110 at a logical one level. During the acceleration portion of the cycle, the first derivative is a logical one level signal and the second derivative is a logical zero level signal. This maintains the output of gate 136, on conductor 148, at a logical one level and the output from gate 106 at a logical one level. During the post-inflection portion of the cycle, the first and second derivatives are a logical one level and the output of gate 136 on conductor 148 switches to a logical zero level, which renders the output from gate 106 at a logical zero level.

The output gate 106, as impressed on node 108, is fed to a square wave pulsing circuit 7 by means of a conductor 200. Also, the first derivative signal on conductor 140 is also fed to the pulsing circuit 7 by means of a conductor 202. The two signals on conductors 200 and 202 are fed to the input circuit of an "and" gate 206, the output of which is fed to a second gate 208. It is to be noted that the output of gate 106 is also fed forward from the conductor 200 to the input circuit of gate 208 by means of a conductor 210. The output of gate 206 is fed to an inverter circuit 214 to provide an output signal on conductor 216 in response to the signals being impressed on input conductors 200 and 202. The voltage on conductor 216 is normally low during the period that the brakes have not been applied or in the preskid mode of operation.

The circuit 7 includes a triangle wave generator system 220 which generates an output voltage having a wave form that increases along a straight line to a preselected level and then decreases to a second level along a second straight line. The output of the triangle wave generator 220 is fed through a resistor 222 which forms, with a second resistor 224, a summing circuit. The output of the summing circuit, at node 226, is fed to the base electrode of an output transistor 228. The base electrode of the output transistor 228 is so biased, as will be hereinafter explained, that the triangle wave generated by circuit 220 will maintain the transistor 228 in the conductive state. The collector electrode of transistor 228 is connected to a source of positive potential through resistor 230 and the emitter electrode is grounded at 232. The zero duty cycle during the preskid portion of the cycle is fed to an output terminal 234.

As was stated above, the resistor 224 forms a portion of the summing circuit, the voltage at resistor 224 being derived from a node 238. The node 238 is connected to a capacitor 240 by means of a conductor 242, the other plate of the capacitor 240 being grounded at 244. The capacitor 240 supplies a bias for the transistor 228 by means of the resistor 224, the voltage at node 238 being added to the voltage generator by the triangle wave generator. This voltage is sufficiently high to saturate the transistor 228 and maintain its conductive state during the initial application of the brakes.

The charge on capacitor 240 is supplied through the emitter-collector circuit of a transistor 250, the emitter electrode being connected to a source of positive voltage through a conductor 252 and the collector electrode being connected to the capacitor 240 by means of a conductor 254. The conduction of transistor 250, which is normally conductive, is controlled by the voltage impressed on conductor 200, this voltage being fed to the base electrode of transistor 250 by means of a conductor 260, a diode 262 and a resistor 264. The voltage on conductor 200 is normally low, and is of such a magnitude and polarity as to bias the transistor 250 in the normally conductive state. Thus, during the preskid portion of the operation of the braking system, the transistor 250 maintains a charge on capacitor 240.

As was stated above, the conductor 260 provides an output signal, this signal being fed to a discharge capacitor 270, and particularly to the base electrode thereof, through a resistor 272. The collector electrode of transistor 270 is connected to the conductor 242, and thus in circuit with the capacitor 240, and the emitter electrode thereof is grounded by means of a conductor 274. The voltage at node 238 is also controlled by a circuit including a zener diode 278 which is connected to ground at one electrode thereof and is connected to the node 238 by means of a resistor 280 and a diode 282. The junction of the diode 282 and the zener diode 278 is connected to a positive source of d.c. potential by means of a resistor 286.

In operation, the signal on conductor 200 is at a logical zero level during the preskid portion of the cycle, is at a logical one level during the skid and acceleration portions of the cycle and is at a logical zero at the post-inflection portion of the cycle. On the other hand, the signal on conductor 202 is at a logical zero level during the preskid and skid portions of the cycle, and thus until the start of the run-up of the wheels. The voltage then switches to a logical one level from the start of the run-up portion of the cycle to the top of the run-up portion. Thus, the output of gate 206 is normally at a logical one level and the output of gate 208 is normally at a logical one level. Accordingly, the signal on conductor 216 will be at a logical zero level to maintain the transistor 270 in the nonconductive state. This condition maintains the voltage on capacitor 240 at a high level, this high level being added with the voltage being generated by the triangle wave generator circuit 220 to maintain the transistor 228 in the saturated state.

During the initial operation of the circuit, the signal on conductor 260 is relatively low to maintain the transistor 250 in the conductive state. Thus, the capacitor 240 is charged to a preselected maximum voltage and this maximum voltage contributes to maintaining the transistor 228 in the saturated state. Upon sensing the skid portion of the cycle, the output of gate 214 switches from a logical zero level to a logical one level to cause the conduction of transistor 270. Upon the occurrence of the conduction of transistor 270, the voltage at node 236 immediately drops to the zener avalanche voltage of the zener diode 278 due to the voltage being impressed thereon from the source of d.c. potential through the resistor 286. The lowering of the voltage to the zener avalanche voltage of node 238 causes the transistor 228 to drop out of saturation during selected portions of the signal being generated from the triangle wave generator 220. This causes a series of output pulses being generated at output terminal 234, which pulses have a fixed low duty cycle. The generation of the fixed duty cycle pulses readies the control device connected to the output terminal 234. In the particular illustrated embodiment, the control device takes the form of a force motor to be described in conjunction with FIGS. 2–4.

When the system achieves the skid mode of operation, the voltage output from gate 214 switches to a logical one level, the signal being fed by means of conductor 216 and resistor 272 to the transistor 270. This logical one signal causes transistor 238 to commence conduction, thereby completing a discharged path from the capacitor 240 to ground through the collector emitter circuit of transistor 270. It is to be noted that the transistor 270 is provided with a fixed bias, thereby fixing the current flow from the capacitor 240 through the collector emitter circuit of transistor 270. Thus, the capacitor discharges at a fixed linear rate to vary the voltage at node 238. This variation in voltage is summed with the output of the triangle wave generator 220 to vary the duty cycle of the pulses being generated at the output terminal 234. As is seen, the duty cycle steadily increases in accordance with the decrease in voltage or charge on capacitor 240.

When the acceleration portion of the cycle is reached, the voltage on conductor 216 drops to a logical zero level and the voltage on conductor 260 rises to a logical one level to cause transistors 270 and 250, respectively, to cease conduction. Thus, the voltage being fed to node 238 is held at a constant value to maintain the duty cycle of the pulses being generated by the transistor 228 at a constant level. This is the hold mode of operation.

Upon sensing the post-inflection point of the wheel velocity cycle, the voltage on conductor 260 drops to a logical zero level to cause transistor 250 to conduct. The conduction of transistor 250 creates a charging path from the direct current potential connected to conductor 252, through the emitter-collector circuit of transistor 250 and through the conductor 254 to the capacitor 240. The increasing charge on capacitor 240 is fed to the node 238 and summed with the wave form being generated by the triangle wave generator circuit 220. This causes the duty cycle of the output pulses being generated by transistor 228 to slowly decrease until such time as the zener voltage of zener diode 278 is achieved. At this time, the capacitor 240 is charged at a different rate due to the addition of the resistor 280, the diode 282, the zener diode 278 to the circuit. The capacitor 240 will then charge to the preskid voltage as described above. During the charging (or decreasing duty cycle) portion of the cycle, the output force motor and valve assembly is operated in the return node of operation.

The significance of these relative signal duty cycles during the various portions of the wheel cycle will become apparent from a description of a preferred form of triple mode valve assembly to be described in conjunction with FIGS. 2–4. Referring now to FIGS. 2–4, there is illustrated a valve control assembly 310 which is utilized to control the application of fluid brake pressure to the wheel cylinders connected to a fluid output assembly 312, the pressure at the outlet port of assembly 312 being controlled by means of a hydraulic cylinder assembly 314. The input to the hydraulic cylinder assembly 314 is provided by means of a hydraulic line (not shown) connected to an inlet port 316 and a hydraulic piston assembly 320. The position of the piston assembly 320 is controlled by a diaphragm assembly 324, which, at its initial or rest balanced position, is provided with vacuum on either side of a diaphragm assembly 326. The vacuum or atmospheric pressure on the right side of the diaphragm assembly 326 is controlled by means of a control module 330, the control module 330 being in turn controlled by a force motor assembly 332.

In general, in the dump mode of operation, atmospheric pressure is supplied to the right side of the diaphragm assembly 326 by pulsing a valve assembly 406 the appropriate duty cycle to force the plunger assembly 320 to the left thereby closing the fluid passageway between inlet port 316 and outlet port 312. This removes brake pressure from the wheel cylinders to permit the wheels to spinup. On the other hand, when it is desired to go into the hold mode of operation, the valve assembly 406 is rapidly pulsed to trap the pressure in the right side of the diaphragm assembly to hold the plunger assembly 320 at the position reached when the hold mode of operation was signaled. Finally, in the return mode of operation, the pulses of current to the force motor assembly 232 are varied and the system achieves the position shown in FIGS. 2–4 to force the plunger 320 to the right to open the valving between the inlet port 316 and the output port 312 to return brake pressure to the wheel cylinders.

Referring specifically to the details of the hydraulic cylinder assembly 320, the assembly includes a piston element 340, the position of which is controlled by the diaphragm assembly through movement of a sleeve 342 as will be hereinafter explained. When the cup shape housing 342 moves to the left, the piston 340 will also move to the left due to the hydraulic pressure being exerted at the inlet port 316. The right end 346 of the piston 340 supports a valving assembly which includes a main poppet valve 348 which is slidably supported within bore 350 by means of a washer element 352. The initial movement of the piston 340 to the left permits a shoulder element 354 on the pocket valve body 348 to engage a valve seat 356 to close off fluid flow around the valve body 348. Further movement of the piston element 340 permits a bleeder valve 360 to close over a port (not shown), the valve 360 being slidably supported by means of a stem 362 mounted within a bore of the main valve body 348. In addition to the hydraulic pressure, the valve elements 348 and 360 are biased to the left by means of spring elements 362, 364 which are seated at one end thereof against a plug element 366 supported within the bore 350. The bleeder valve 360 may be eliminated from the assembly, if desired.

In the position shown in FIG. 2, fluid flow will enter the port 316, flow through the bore of the plug element 366, through the valve assembly, including valve bodies 348, 360, through the bore 370 and through the outlet port 312 by means of an outlet port assembly 372. The piston 340 is supported in sliding relation to the main body 376 by means of a bearing element 378 which is fixedly supported within the housing of the diaphragm assembly 324. Suitable sealing washers 380, 382 are provided to seal the piston 340 in its sliding movement.

As was stated above, the initial movement of the piston 340 to the left moves the main valve body 348 to the left to seat the valve body against the valve seat 356. Upon further movement of the piston element 340, the second valve body 360 moves into engagement with the main valve body to completely shut off the hydraulic pressure to the wheel cylinders. Upon return of the piston 340 to the right, the opposite action occurs.

Referring to the specific details of the diaphragm assembly, the assembly includes a main diaphragm housing 384, the interior of which is connected to a source of vacuum (not shown) which generally is supplied by the engine vacuum system. The interior of the housing 384 is provided with a bell shaped support member 386 which is utilized to support one end of a spring 388, the other end of the spring being biased against the interior of a diaphragm element 390 by means of a second support element 392. The bell shaped member 386 includes, at its apex, an annular resilient washer element 394 which provides a stop for one direction of movement of the housing 342. The end of the housing 342 includes a washer element 398 which is adapted to position itself against the annular washer 394 when the housing element is initially assembled. The interior of the housing is connected to a vacuum source as described above and the other side of the diaphragm element is in fluid communication with a control chamber 400, the control chamber also being provided with vacuum through a pipe 402 connected at one end to the interior of the housing 384 and at the other end to the control chamber through a valving arrangement to be described hereinafter. Sufficient to say at this time that the vacuum is communicated to the control chamber through the valve assembly 406, a chamber 408 and a conduit 410 formed in the housing for the valve assembly 406. Thus, in the normal situation, with the valve assembly 406 in the position shown, both sides of the diaphragm assembly are connected to vacuum to provide a rest position for the diaphragm.

The top of the housing 384 is closed by means of an end bell assembly 412 which is bolted to the housing 384 by means of a plurality of fastener assemblies 414. The end bell assembly 410 also supports the plunger and valve assembly 340. For other details of this valve and diaphragm assembly, specific reference is made to Copending Application of William Stelzer, Ser. No. 702,095, Filed Jan. 31, 1968, now U.S. Pat. No. 3,495,882 the specification of which is incorporated herein by reference.

Referring specifically to FIG. 2, the force motor assembly 332 is utilized to control the position of a second diaphragm assembly 420. Specifically, the diaphragm assembly 420 includes a diaphragm 422 and a pair of chambers 424, 426 (the chamber 426 being collapsed in the illustrated arrangement) positioned on either side of the diaphragm 422. The diaphragm 422 is positioned in its illustrated location by means of a spring element 428 in the chamber 408 which acts against a shaft 432 through the valve assembly 406. The armature 438 is mounted directly on a shaft 440 which is connected in operative relation to open and close a valve assembly 442.

The valve assembly 442 comprises a valve seat body 444 which is mounted within a cavity 446, the cavity 446 being supplied from a source of air through suitable filters (not shown). The valve body 444 includes a passageway 448 for communicating the chamber 446 with a second chamber 450, the flow of air from the chamber 446 to the chamber 450 being controlled by a valve element 452. The valve element 452 is held against the valve seat formed on body 444 by means of a spring member 454. The chamber 450 is also supplied from a source of vacuum by means of a tubular element 460 and a passageway 462, the tubular element being supplied from the same vacuum source supplying the chamber 424. The vacuum source is communicated with the opposite side of the diaphragm 422 by means of a passageway 464.

Accordingly, when coil 436 is energized with current pulses, the duty cycle of the pulses is insufficient to move the armature element 438 and thus the valve element 452 is held against the valve seat formed by body 444 by the spring element 454. After the skid portion of the cycle is initiated, the duty cycle of the current pulses being fed to the coil 436 are steadily increased to cause the valve element 452 to pulse in accordance with the frequency of the pulses being fed to the coil 436. The pulsing of the valve body modulates the vacuum being supplied from the source through tube 460 and passageway 462, the vacuum alternately being shut off and recommunicated by the valve body 452 seating against the opposite face 470. When the valve body 452 is against the face 470, the source of air through passageway 448 is communicated with the chamber 450 and thus passageway 464 to the right side of the diaphragm element 422. This creates a pressure differential across the diaphragm to cause the diaphragm to alternately move to the left and right in accordance with the pulses being fed to the coil 436. The valve body 452 is sufficiently low in inertia to generally follow the pulses being fed to the coil 436. These pulses generally are in the range of approximately 25 cycles per second up to several hundred cycles per second. In one preferred embodiment, it has been found that 60 cycles per second will operate satisfactorily.

The movement of the diaphragm 422 causes the shaft 452 to move accordingly. The movement of shaft 432 back and forth causes the valve assembly 406 to operate in accordance with the pulses being fed to the coil 436. The valve assembly 406 generally includes a first valve element 480 which is adapted to seat against a valve seat 482 and a second valve element 484 which is adapted to seat against a valve seat 486. Thus, the valve assembly 406 controls the pressure in control chamber 400 by controlling the pressure in a chamber 488, which is communicated with the chamber 400 by means of a passageway 490, the passageway 410 and a second passageway 492.

When the shaft 432 has moved to the left, the valve element 480 is positioned against the valve seat 482 to discontinue the communication of the vacuum source 402 to the chamber 408. Also, the valve 484 is moved away from the valve seat 486 to communicate a chamber 494 with the chamber 408. The chamber 494, as is best seen from FIG. 4, is communicated with an air source through conduit 494 and a chamber 496, this air source being communicated with the chamber 408 when the valve 484 is opened.

In the higher range of frequencies, the pressure change in control chamber 400 is insignificant in response to the pulses being fed to the coil 436. Accordingly, the diaphragm assembly 326 will be positioned in accordance with the pressure being communicated with the chamber 400. On the other hand, in the lower frequency range of pulses, the diaphragm is able to somewhat follow the pulsing provided coil 436. Thus, the diaphragm 326 will move slightly in response to the pulses being fed to the coil 436. However, the wheel assembly, particularly the springs connected to the brake shoes and the brake shoes themselves, have sufficient lost motion and inertia that the wheel will not experience a change in force in response to a slight modulating change in the position of diaphragm 326.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A skid control system for controlling the operation of a control valve assembly connected in controlling relation with the hydraulic brake system of a wheeled vehicle, the valve assembly controlling the application of hydraulic force to the wheel brake to provide a run-down and spin-up portion of a brake cycle including a release, a reapply and a hold interval, the improvement comprising the control system having at least three modes of operation within a brake cycle and including an output coil, said system including pulse generating means including means for generating a stream of pulses in said intervals, said generating means generating a first pulsing signal formed of a first series of pulses within at least a portion of said release interval of the cycle, a second pulsing signal formed of a second series of pulses within at least a portion of the reapply interval for returning pressure from the wheel, and a third pulsing signal formed of a third series of pulses within at least a portion of the hold interval of the cycle, for holding pressure at the wheel during at least a portion of the acceleration portion of the wheel cycle, at least two of said signals varying in part, one from the other, in duty cycle.

2. The improvement of claim 1 wherein said control system includes means for sensing a critical slip signal, the sensing of said critical slip signal initiating the dump mode of operation.

3. The improvement of claim 2 wherein said control system includes means for sensing the wheel velocity, means for deriving the first and second derivatives of said wheel velocity and means for correlating said first and second derivative to initiate the hold mode of operation.

4. The improvement of claim 2 wherein said critical slip sensing means includes means for deriving a hypothetical vehicle velocity signal and means for comparing said vehicle velocity signal with said wheel velocity signal.

5. The improvement of claim 4 wherein said critical slip signal occurs when said wheel velocity signal drops a preselected amount below said hypothetical vehicle velocity signal.

6. The improvement of claim 1 wherein said control system includes means for sensing the wheel velocity, means for deriving the first and second derivatives of said wheel velocity and means for correlating said first and second derivative to initiate the hold mode of operation.

7. The improvement of claim 6 wherein said control system includes means for sensing a change in sign in said second derivative signal for initiating said return mode of operation.

8. The improvement of claim 1 wherein said control system includes means for sensing the angular velocity of said wheel means for deriving the second derivative of said wheel velocity signal and means for sensing a change of sign of said second derivative signal for initiating said return mode of operation.

9. The improvement of claim 8 wherein said control system includes means for sensing a critical slip signal, the sensing of said critical slip signal initiating the dump mode of operation.

10. The improvement of claim 1 wherein said third pulsing signal is a signal having a relatively constant duty cycle to trap the hydraulic pressure force at the wheels upon sensing the acceleration portion of the wheel cycle.

11. The improvement of claim 1 wherein said control system includes wheel velocity sensing means, first means for generating a critical slip signal during the run-down portion of the wheel, second means for deriving the first derivative of said wheel velocity signal and third means for deriving the second derivative of said wheel velocity signal, said control circuit including logic means for correlating said first, second and critical slip signals to generate said first, second and third output signals, said first output signal having a characteristic of a generally increasing duty cycle, said second signal having a characteristic of a generally decreasing duty cycle and said third signal having a characteristic of a constant duty cycle.

12. A skid control system for controlling the operation of a control valve assembly connected in controlling relation with the hydraulic brake system of a wheeled vehicle, the valve assembly controlling the application of hydraulic force to the wheel brake, the improvement comprising the control system having at least three modes of operation and including a low inertia, output coil, said system generating a first pulsing signal at said coil for dumping the pressure from the wheel, a second pulsing signal for returning pressure from the wheel and a third pulsing signal for holding pressure at the wheel during at least a portion of the acceleration portion of the wheel cycle, at least two of said signals varying in part, one from the other, in duty cycle, wheel velocity sensing means, first means for generating a critical slip signal during the run-down portion of the wheel, second means for deriving the first derivative of said wheel velocity signal and third means for deriving the second derivative of said wheel velocity signal, said control circuit including logic means for correlating said first, second and critical slip signals to generate said first, second and third output signals, said first output signal having a characteristic of a generally increasing duty cycle, said second signal having a characteristic of a generally decreasing duty cycle and said third signal having a characteristic of a constant duty cycle, first logic gate means for correlating said first and second derivative signal and second logic gate means for correlating the output of said first logic gate means and said first critical slip signal.

13. The improvement of claim 12 including third logic gate means for correlating the output of said first logic gate means and said first derivative signal.

14. The improvement of claim 12 including variable duty cycle pulse generating circuit, said circuit generating said first, second and third pulse signals and an initial pulsing signal, said initial pulsing signal having a constant duty cycle and occuring at the start of the pre-skid mode of operation.

15. The improvement of claim 14 wherein said pulse generating circuit includes charge storage means, said charge storage means being initially charged to turn off the output pulses when said wheel is unbraked.

16. The improvement of claim 15 wherein the effective charge of said charge storage means is reduced to produce said initial pulses.

17. The improvement of claim 16 wherein said charge is decreased along a generally linear curve to increase the output duty cycle of said first pulsing signal.

18. The improvement of claim 17 wherein said charge is maintained at a preselected level during said holding pressure mode of operation.

19. The improvement of claim 18 wherein said charge is increased along a linear curve to decrease the duty cycle of said second pulsing signal.

20. A skid control system for controlling the operation of a control valve assembly connected in controlling relationship with the hydraulic brake system of a wheeled vehicle, the first assembly controlling the application of hydraulic force to the wheel brake, the improvement comprising the method of operating the control system in at least three modes of operation including the steps of generating a first pulsing signal of a first increasing duty cycle characteristic for dumping pressure from the wheel, generating a second pulsing signal of decreasing duty cycle characteristic for returning the brake pressure to the wheel, and a third pulsing signal of a second constant duty cycle for holding the pressure during the acceleration portion of the wheel cycle.

* * * * *